United States Patent [19]

Hinden et al.

[11] Patent Number: 4,861,631
[45] Date of Patent: Aug. 29, 1989

[54] FLEXIBLE CONNECTOR MATERIAL

[75] Inventors: Milton Hinden, Glen Head; John Lyons, Levitown, both of N.Y.

[73] Assignee: Duro Dyne Corporation, Farmingdale, N.Y.

[21] Appl. No.: 215,302

[22] Filed: Jul. 5, 1988

[51] Int. Cl.[4] .................. F16L 21/06; F16L 59/14
[52] U.S. Cl. ........................ 428/34.5; 285/53; 285/293; 285/424; 428/35.9; 428/36.2; 428/122; 428/198
[58] Field of Search ............... 285/53, 293, 424; 428/34.5, 35.9, 36.2, 198, 122

[56] References Cited

U.S. PATENT DOCUMENTS 3,214,807 11/1965 Hinden .................. 285/424
3,439,406 12/1966 Wallin .................. 285/424
4,183,557 1/1980 Hinden .................. 285/424
4,483,895 11/1984 Deaver .................. 428/198

Primary Examiner—Ellis P. Robinson
Assistant Examiner—James J. Seidleck
Attorney, Agent, or Firm—Mark T. Basseches; Paula T. Basseches

[57] ABSTRACT

An improved flexible connector material is comprised of a pair of metal strips between which is mounted a flattened tubular configuration including upper and lower flexible sheets or layers encompassing a compressible glass wool batt. The insulation is bonded preferably to the lower layer of a pair of spaced flexible glue lines whereby the tendency of the insulation to become compressed and change in configuration is overcome.

2 Claims, 1 Drawing Sheet

FLEXIBLE CONNECTOR MATERIAL

BACKGROUND OF THE INVENTION

1. Field of the Invention

The present invention is directed to a stock material supplied on a roll from which lengths may be cut and used in circulation air systems to span the spaced opposed edges of adjacent air ducts to prevent leakage of air and transmission of vibration from one duct to another.

2. The Prior Art

It is known in circulating air systems, such as air conditioning systems, air heating systems and the like to avoid the transmission of vibrations, for instance from a blower duct section to a distributor duct section, to provide in spanning relation between the noted section a joint comprised of metallic margins having an air-impervious flexible material bonded therebetween. The metal margins are bent to the shape of the duct ends to be connected, and are secured to such ends, the flexible material interposed between the margins minimizing transmission of vibration while at the same time preventing air leakage. Contemporary air circulating systems typically are insulated so as to make the same as energy efficient as possible.

U.S. Pat. No. 4,183,577, assigned to the assignee hereof, discloses a highly efficient form of flexible connector which, in addition to providing vibration damping, also functions to minimize heat loss at the interface between adjacent duct ends.

The material of the above referenced patent comprises a flattened tubular material spanning the metallic members connected to the ducts, the tubular material encompassing therein a thickness of insulating material or stuffing.

Heretofore the materials employed as insulation have been flexible foams, such as urethane foams and/or rubber foams, or batts of material such as glass wool.

It has been observed that the use of foams, while providing highly efficient initial insulating properties, have over time lost their insulating effect. This loss is due to the tendency of such foam materials to harden and crumble due to repeated billowing and contracting effects which result from repeated cycles of compression and relaxation as the air systems are pressured and turned off.

A further factor which results in breakdown of the material is the exposure of the insulation to high heats when used in the winter and to the cooling influences when used in air conditioning systems.

The use of glass wool batts has been found to provide superior results since such batts are less susceptible to the degrading effects of the heating and cooling and breakdown under repeated cycles of billowing and relaxation.

However, it has been found that in use for protracted periods glass wool has tended to lose its shape or configuration as a band extending between the metallic margins and has taken the form of a generally cylindrical mass which progressively compacts under repeated cycling, with the result that areas form between the confining flexible layers which are free of insulation, with resultant degradation of the insulating properties.

SUMMARY OF THE INVENTION

The present invention may be summarized as directed to an improved flexible connector which will retain its effective insulating properties over protracted periods of use, i.e. to an improvement of the flexible connector of U.S. Pat. No. 4,183,557 (incorporated herein by reference) and the various patents cited therein.

Still more particularly, the present invention relates to a flexible connector stock material including a pair of metallic strips, a marginal edge of each said strip being clampingly engaged with a pair of flexible sheets or layers defining a flattened tubular conformation, the tubular conformation including therein a band comprised of a batt of glass wool or the like, the batt being bonded by longitudinally extending flexible glue lines to one, and preferably to the inner one, of the flexible sheets spanning the metal strips.

By the formation of glue lines as aforesaid it has been found that the tendency of the batt to ball or compress is counteracted, whereby the body of insulation is retained in the desired position spanning the tubular configuration defined by the flexible sheets.

It is accordingly an object of the present invention to provide an improved flexible connector material which retains its insulating properties over protracted use periods.

To attain these objects and such further objects as may appear herein or be hereinafter pointed out, reference is made to the accompanying drawings, forming a part hereof, in which.

Figure 1:
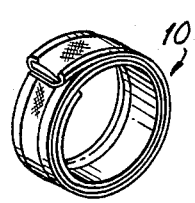
FIG. 1 is a perspective view of a roll of flexible connector in accordance with the invention.
Figure 2:
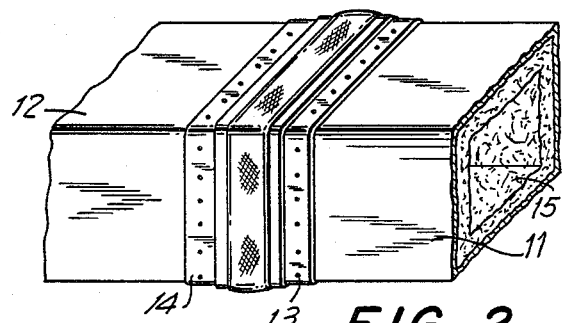
FIG. 2 is a perspective view of a pair of duct ends linked by a formed length of flexible connector.

Referring now to the drawings, there is shown in FIG. 1 a coil 10 of flexible connector stock material, lengths of which may be severed for forming into the conformation of adjacent duct ends to permit uninterrupted air passage while at the same time providing a barrier against vibration.

In a typical environment, a length of the material may be used to connect a rectangular duct, illustratively 11, leading from the plenum of a furnace to a downstream distribution duct 12.

The flexible connector material is formed into a joint between duct sections 11, 12 by severing a length from coil 10 and bending the metal strips 13, 14 thereof to correspond to the rectangular conformation of ducts 11, 12, and thereafter fastening the strips to the ducts in a manner known per se.

As is conventional, for energy saving purposes the interior surfaces of the ducts 11, 12 are preferably lined with insulative material 15 to minimize heat transfer.

Figure 3:
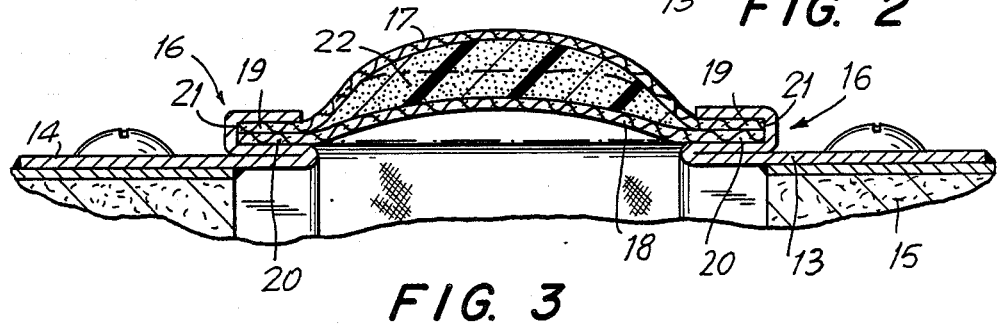
FIGS. 3 and 4 are magnified transverse sectional views of a prior art flexible connector material illustrating "as installed" and "after use" conditions of the material, respectively.
Figure 4:
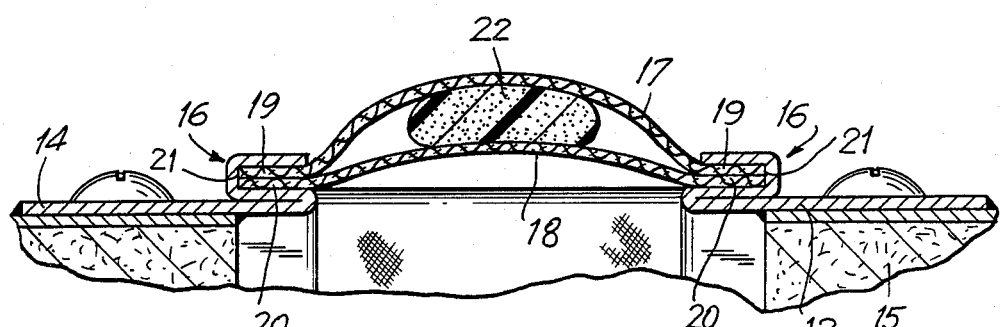

Referring now to FIGS. 3 and 4 illustrating prior art flexible connector material, and more particularly flexible connector material in accordance with U.S. Pat. No. 4,183,557, the material is comprised of first and second metal strips 13, 14 having inner marginal edges 16, 16 folded into a generally S-shaped configuration.

The marginal edges 16, 16 clampingly retain the margins of upper and lower flexible, air-impervious layers or sheets 17, 18 to form a structure in the configuration of a flattened tube.

More particularly, the marginal edges 19, 19 of the upper layer 17 are superposed over the marginal edges 20, 20 of the lower layer 18 and are clamped within recesses 21, 21 formed by the bent marginal edges 16, 16 of the strips 13, 14.

Captured between the upper and lower layers 17, 18 is a band of insulating material 22, preferably in the form of a batt of glass wool material.

Initially, as shown in FIG. 3, the batt 22 fills the entire widthwise expanse between the margins 16, 16 of the strips. Thus, when a duct encircling joint is formed by bending strips 13, 14 to the conformations of the ducts 11, 12 and the strips are screwed or otherwise connected to the ducts (see FIG. 3), the entire space between layers 17, 18 is filled with the insulation batt and heat transfer through the composite web comprised of layers 17, 18 and the encased insulation is minimal.

As thus described, the construction is essentially as shown in U.S. Pat. No. 4,183,557.

We have discovered that the initially effective heat transfer blocking qualities of the joint thus formed are progressively compromised. Loss of effectiveness has been found to result from the repeated deflection of the tubular member comprises of layers 17, 18 and insulation 22 in an outward direction when the system is subjected to a pressure cycle, and in an inward direction when the blower is turned off and the material flexes inwardly under its natural resilience or elasticity. (Compare dotted line, expanded shape, FIG. 3, with solid line position.)

Over a period of time the repeated flexing tends to compact the fibrous material 22 so as to cause the same to form an ovoid or even a cylindrical configuration as shown in FIG. 4.

As will be apparent from FIG. 4, the compacted insulation material 22 provides areas between layers 17 and 18 which are barren of any protective insulation.

As will be evident, the structure as shown in FIG. 4 is susceptible of substantial heat transfer in those areas within the tubular configuration from which the insulating layer 22 is missing.

Figure 5:
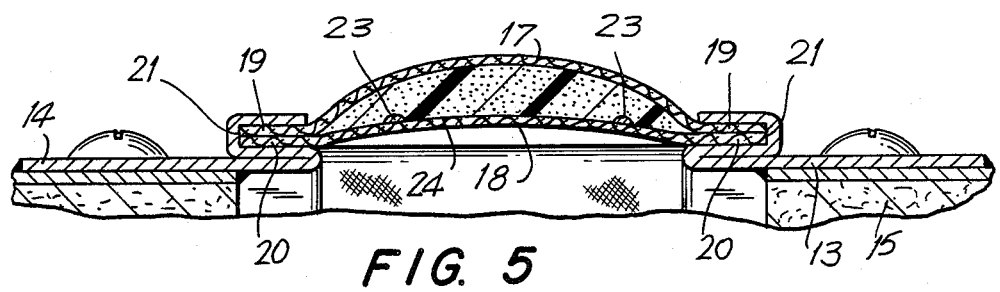
FIG. 5 is a view similar to FIGS. 3 and 4 illustrating the flexible connector of the present invention.

In FIG. 5 there is shown a transverse section through a flexible connector material in accordance with the invention.

The FIG. 5 flexible connector material is similar to the prior art material shown in FIGS. 3 and 4 except for the provision of a pair of mutually spaced, longitudinally extending glue lines 23, 23 which bond the undersurface 24 of the insulating batt to the inner surface of the lower layer. (Since the structure of FIG. 5 is identical to that of prior art FIGS. 3 and 4 except as noted, like parts of the FIG. 5 showing have been given the same reference numerals as the elements of FIGS. 3 and 4.)

The glue lines 23, 23 are preferably disposed from approximately one quarter to one third of the width of the batt 22 inwardly from the side marginal edges of the insulating batt. The glue lines 23, 23 are preferably formed from a flexible hot melt adhesive, the thickness of the lines having been exaggerated in the instant drawings for purposes of illustration.

The glue lines function, to a degree, to simplify fabrication of the connector since the insulation batt is relatively difficult to be handled, whereas after the batt is secured to the more readily handled fabric or sheet material forming the lower layer 18 the composite of sheet and batt may be readily fed to the roll forming device which crimps margins 16 over the margins of layers 17 and 18.

We have discovered that despite the relatively fragile and crumbly nature of a glass wool batt, the same, when bonded in the manner shown to the layer 18 (or less preferably to the layer 17) will provide virtually unlimited cycles of billowing and contraction without loss of structural integrity and, hence, without loss of insulating capacity.

There is accordingly provided by the invention a superior insulating flexible connector material which will retain its insulating function over extended periods of use.

The use of compressible glass wool material enables the flexible connector to be convoluted tightly for efficient packing, the insulation being flattened in the convoluted form and yet springing back when a length of material is severed from the roll.

As will be apparent to those skilled in the art, numerous variations in details of construction will occur to those persons familiarized with the disclosure. Accordingly the invention is to be broadly construed within the scope of the appended claims.

Having thus described the invention and illustrated its use, what is claimed as new and is desired to be secured by Letters Patent is:

1. As an article of manufacture, an elongate supply of improved flexible connector stock material from which lengths are adapted to be cut for formation by transverse bending to the configuration of an air duct, said stock material comprising two elongate metallic strips substantially flat in transverse section and an elongate composite web of air-impervious insulating and vibration damping material secured therebetween, each said metallic strip having a free marginal edge and a clamping marginal edge comprised of a folded-over longitudinal marginal portion of said strip, said flexible web comprising upper and lower layers of flexible, air-impervious sheet material defining a flattened tubular conformation, each of the side marginal edges of said upper and lower layers being clampingly crimped within said clamping marginal edge of a respective one of said metallic strips, thereby to maintain said layers in said tubular conformation, and a compressible depthwisely resiliently expansible strip of insulating material interposed between said layers and captured within said flattened tubular conformation, characterized in that said strip comprises a fibrous batt of insulating material extending between said clamping marginal edges and substantially filling the space within said tubular conformation, the improvement comprising said batt being bonded along its length to said lower layer by two longitudinally extending bands of flexible adhesive material, said bends being offset to opposite sides of the transverse center line of said batt, and being displaced from a marginal edge of said batt by one quarter to one third of the width of said batt, said batt being free of connection to said lower layer in the area between said bands and the adjacent marginal edges of said batt.

2. An article in accordance with claim 1 wherein said batt is comprised of glass wool.

* * * * *